US012161900B2

(12) United States Patent
Hilton

(10) Patent No.: US 12,161,900 B2
(45) Date of Patent: Dec. 10, 2024

(54) ADJUSTABLE INERT GAS GENERATION ASSEMBLY FOR WATER-BASED FIRE PROTECTION SYSTEMS

(71) Applicant: Engineered Corrosion Solutions, LLC, St. Louis, MO (US)

(72) Inventor: Adam H. Hilton, Chesterfield, MO (US)

(73) Assignee: Engineered Corrosion Solutions, LLC, St. Louis, MO (US)

( * ) Notice: Subject to any disclaimer, the term of this patent is extended or adjusted under 35 U.S.C. 154(b) by 747 days.

(21) Appl. No.: 16/963,097

(22) PCT Filed: Jan. 18, 2019

(86) PCT No.: PCT/US2019/014127
§ 371 (c)(1),
(2) Date: Jul. 17, 2020

(87) PCT Pub. No.: WO2019/143890
PCT Pub. Date: Jul. 25, 2019

(65) Prior Publication Data

US 2020/0346060 A1 Nov. 5, 2020

Related U.S. Application Data

(60) Continuation-in-part of application No. 16/259,974, filed on Jan. 28, 2019, now Pat. No. 10,799,738,
(Continued)

(51) Int. Cl.
*A62C 35/68* (2006.01)
*A62C 35/60* (2006.01)
(Continued)

(52) U.S. Cl.
CPC .............. *A62C 35/68* (2013.01); *A62C 35/60* (2013.01); *A62C 35/62* (2013.01); *A62C 35/645* (2013.01);
(Continued)

(58) Field of Classification Search
CPC ......... A62C 35/68; A62C 35/60; A62C 35/62; A62C 35/645; Y10T 137/3115; Y10T 137/8634
See application file for complete search history.

(56) References Cited

U.S. PATENT DOCUMENTS 1,459,594 A 6/1923 McWhorter et al.
2,187,906 A 1/1940 Lowe
(Continued)

FOREIGN PATENT DOCUMENTS

DE 3938394 A1 5/1991
EP 1074276 A2 2/2001
(Continued)

OTHER PUBLICATIONS

Compressed Gas Technologies, Nitrogen Generator Specialists, 2009; 1 page; Retrieved online on Mar. 27, 2009 at http://www.nitrogen-generators.com.
(Continued)

*Primary Examiner* — Qingzhang Zhou
(74) *Attorney, Agent, or Firm* — Husch Blackwell LLP

(57) ABSTRACT

An adjustable inert gas generation assembly for producing a flow of inert gas for introduction into a pipe network of a fire protection system includes an inert gas generator with an outlet in fluid communication with the pipe network and configured for selectively producing a flow of inert gas to the pipe network at least at a first purity level and a second purity level, wherein the first purity level is produced while the assembly is in a first mode and the second purity level
(Continued)

is produced while the assembly is in a second mode; wherein the second purity level is higher than the first purity level; and a control circuit in electrical communication with the inert gas generator and configured to selectively switch the inert gas generator between the first and second modes.

8 Claims, 2 Drawing Sheets

Related U.S. Application Data which is a division of application No. 14/341,398, filed on Jul. 25, 2014, now Pat. No. 10,188,885, which is a division of application No. 13/048,596, filed on Mar. 15, 2011, now Pat. No. 9,526,933, which is a continuation-in-part of application No. PCT/US2009/056000, filed on Sep. 4, 2009, which is a continuation of application No. 12/210,555, filed on Sep. 15, 2008, now Pat. No. 9,144,700.

(60) Provisional application No. 62/619,646, filed on Jan. 19, 2018, provisional application No. 61/357,297, filed on Jun. 22, 2010.

(51) Int. Cl.
*A62C 35/62* (2006.01)
*A62C 35/64* (2006.01)

(52) U.S. Cl.
CPC .... *Y10T 137/3115* (2015.04); *Y10T 137/8634* (2015.04)

(56) References Cited

U.S. PATENT DOCUMENTS

| | | | | |
|---|---|---|---|---|
| 2,627,868 | A | 2/1953 | Runnels | |
| 3,905,424 | A | 9/1975 | Elwood et al. | |
| 4,104,004 | A | 8/1978 | Graef | |
| 4,991,655 | A | 2/1991 | McHugh | |
| 5,133,577 | A | 7/1992 | Schultze et al. | |
| 5,236,049 | A | 8/1993 | Asselin et al. | |
| 5,611,218 | A | 3/1997 | Naumovitz | |
| 5,803,180 | A | 9/1998 | Talley | |
| 5,845,714 | A | 12/1998 | Sundholm | |
| 6,024,116 | A | 2/2000 | Almberg et al. | |
| 6,076,278 | A | 6/2000 | Bradley | |
| 6,221,263 | B1 | 4/2001 | Pope et al. | |
| 6,293,348 | B1 | 9/2001 | Reilly | |
| 6,343,615 | B1 | 2/2002 | Miller et al. | |
| 6,390,203 | B1 | 5/2002 | Borisov et al. | |
| 6,415,870 | B1 | 7/2002 | Matsuoka | |
| 6,540,028 | B2 | 4/2003 | Wood | |
| 6,578,602 | B1 | 6/2003 | Kirschner | |
| 6,581,694 | B2 | 6/2003 | Golner et al. | |
| 6,601,653 | B2 | 8/2003 | Grabow et al. | |
| 6,666,277 | B2 | 12/2003 | Reilly | |
| 6,841,125 | B1 | 1/2005 | Chartier et al. | |
| 6,926,023 | B2 | 8/2005 | Cabral et al. | |
| 6,960,321 | B1 | 11/2005 | Ludwig | |
| 7,066,186 | B2 | 6/2006 | Bahr | |
| 7,104,336 | B2 | 9/2006 | Ozment | |
| 7,124,834 | B2 | 10/2006 | Sundholm et al. | |
| 7,322,423 | B2 | 1/2008 | Ringer | |
| 7,389,824 | B2 | 6/2008 | Jackson | |
| 7,594,545 | B2 | 9/2009 | Love | |
| 7,673,694 | B2 | 3/2010 | Wagner et al. | |
| 7,712,542 | B2 | 5/2010 | Munroe | |
| 7,717,776 | B2 | 5/2010 | Wagner et al. | |
| 7,845,424 | B1 | 12/2010 | Miller | |
| 7,921,577 | B2 | 4/2011 | Reilly et al. | |
| 8,105,051 | B2 | 1/2012 | Kusay et al. | |
| 8,122,968 | B2 | 2/2012 | Johnson | |
| 8,132,629 | B2 | 3/2012 | Reilly et al. | |
| 8,636,023 | B2 | 1/2014 | Burkhart et al. | |
| 8,720,591 | B2 | 5/2014 | Burkhart et al. | |
| 9,526,933 | B2 * | 12/2016 | Kochelek | A62C 35/68 |
| 2004/0000353 | A1 | 1/2004 | Jones | |
| 2005/0005967 | A1 | 1/2005 | Cabral et al. | |
| 2007/0000258 | A1 | 1/2007 | Bonaquist et al. | |
| 2007/0034256 | A1 | 2/2007 | Ramoth | |
| 2008/0277125 | A1 | 11/2008 | Wilkins et al. | |
| 2010/0065287 | A1 | 3/2010 | Burkhart et al. | |
| 2010/0263882 | A1 | 10/2010 | Bodemann | |
| 2011/0000685 | A1 | 1/2011 | Matsuoka | |
| 2011/0186312 | A1 * | 8/2011 | Gatsonides | B25H 1/00 169/46 |
| 2011/0226495 | A1 | 9/2011 | Burkhart et al. | |
| 2013/0098640 | A1 | 4/2013 | Burkhart et al. | |
| 2014/0246103 | A1 * | 9/2014 | Bodemann | F16K 15/04 137/526 |
| 2014/0338928 | A1 | 11/2014 | Mortensen et al. | |
| 2016/0129291 | A1 | 5/2016 | Bodemann | |
| 2018/0214725 | A1 * | 8/2018 | Tihen | B01D 69/08 |

FOREIGN PATENT DOCUMENTS

| | | | |
|---|---|---|---|
| GB | 1081293 | A | 8/1967 |
| IN | 102661287 | A | 9/2012 |
| JP | 10234881 | A | 9/1998 |
| JP | 2003290380 | A | 10/2003 |
| JP | 2005002977 | A | 1/2005 |
| JP | 2006247237 | A | 9/2006 |
| JP | 3928201 | B2 | 6/2007 |
| JP | 2008073227 | A | 4/2008 |
| WO | 2009096035 | A1 | 8/2009 |
| WO | 2010030567 | A1 | 3/2010 |
| WO | 2015134914 | A1 | 9/2015 |
| WO | 2018140971 | A1 | 8/2018 |

OTHER PUBLICATIONS

On Site Gas Systems, Copyright 2009; 2 pages; Retrieved online on Mar. 27, 2009 at http://www.onsitegas.com.

Potter Electric Signal; Sprinkler Monitoring Training Manual; National Fire Protection Associate [NFPA] and National Electric Manufacturers Association [NEMA]; 46 pages; Retrieved online on Mar. 27, 2009 at http://pottersignal.com/sprinkler datasheets.aspx.

General Air Products; Dry Air Pac FM Approved Compressor Dryer Package for Critical Applications from Generators; Copyright 2009; 4 pages; Retrieved online on Mar. 27, 2009 at http://www.generalairproducts.com/fireprotection/content/view/16/88/.

General Air Products; Desiccant Dryers; 2 pages; Retrieved online on Mar. 27, 2009 at http://www.generalairproducts.com/pages2/desiccant-dryers.html.

Ansul Incorporated, Aquasonic TM Water-Atomizing Fire Suppression System, Data/Specifications, 4 pages (2008).

Engineered Corrosion Solutions, Ejector Automatic Air Vent product information, 3 pages, Mar. 30, 2009.

Engineered Corrosion Solutions, Ejector Automatic Air Vent product information, 3 pages, Jul. 15, 2008.

O'Keefe Controls Co., Metal Orifice Assemblies product information, 6 pages, 2006.

Kinsley, Jr., George R., "Properly Purge and Inert Storage Vessels," CEP Magazine, Feb. 2001, oas. 57-61.

Global Property Loss Prevention Data Sheet 8-29—Refrigerated Storage (May 2007).

National Fire Protection Association, "NFPA 25 Standard for the Inspection, Testing, and Maintenance of Water-Based Fire Protection Systems," (2017).

National Fire Protection Association. "NFPA 13 Standard for the Installation of Sprinkler Systems." (2016).

European Search Report dated Oct. 11, 2021, issued in corresponding European application.

* cited by examiner

ADJUSTABLE INERT GAS GENERATION ASSEMBLY FOR WATER-BASED FIRE PROTECTION SYSTEMS

CROSS REFERENCES

This application claims the priority of, and expressly incorporates by reference herein the entire disclosure of, International Patent Application No. PCT/US2019/014127, filed Jan. 18, 2019, which claims the benefit and priority of U.S. Provisional Patent Application No. 62/619,646, filed Jan. 19, 2018, and is a continuation-in-part of co-pending U.S. patent application Ser. No. 16/259,974, filed Jan. 28, 2019, which is a divisional of and claims priority to U.S. patent application Ser. No. 14/341,398, now U.S. Pat. No. 10,188,885, filed Jul. 25, 2014, which, in turn, is a divisional of and claims priority to U.S. patent application Ser. No. 13/048,596, now U.S. Pat. No. 9,526,933, filed Mar. 15, 2011, which claims the benefit of U.S. Provisional Application No. 61/357,297 filed Jun. 22, 2010, and which is a continuation-in-part of International Patent Application No. PCT/US09/56000 filed Sep. 4, 2009, which claims the benefit and priority of U.S. patent application Ser. No. 12/210,555, now U.S. Pat. No. 9,144,700, filed Sep. 15, 2008.

TECHNICAL FIELD

The present disclosure relates to the generation and maintenance of supervisory gas for water-based fire protection systems, and, more particularly, to a device for generation of a supervisory gas of selectively variable purity.

BACKGROUND

This section provides background information related to the present disclosure which is not necessarily prior art.

Fire protection systems include water-based systems (e.g., wet pipe fire protection systems and dry pipe fire protection systems, the latter of which includes preaction systems), foam based systems, etc. Dry pipe fire protection systems, including preaction fire protection systems, commonly include a pipe network and a source of inert gas such as a nitrogen generator for providing nitrogen gas to the pipe network to control corrosion. Sometimes, the nitrogen generator is operated in a bypass mode to pressurize the pipe network. After the pipe network is pressurized, the nitrogen generator may be operated in a nitrogen mode to produce nitrogen gas at a target purity level. Commonly, valves are manually positioned to change between the bypass mode and the nitrogen mode.

As noted above, it is known to utilize ambient air to initialize fire protection systems, even in systems that utilize an inert gas such as nitrogen to replace the ambient air as the supervisory medium after the pipe network has been pressurized. This use of ambient air rather than the preferable inert gas for initial pressurization is due, at least in part, to the industry requirements for pressurization of these systems. The governing standard for the installation of fire protection systems, NFPA 13, requires that the supervisory gas source for a dry or preaction fire protection system be sized such that it can bring the system to operating pressure within thirty (30) minutes.

When producing nitrogen the volume of the gas produced in inversely proportional to the purity of gas being produced. Therefore, to date, it has been prohibitively costly to utilize an inert gas generator in its inert gas generation mode—rather than some form of bypass mode whereby ambient air is directed into the pipe network rather than the inert gas—because a generator of prohibitive size and resulting purchase, installation, and operating costs would have to be used to satisfy the thirty (30) minute pressurization requirement. This is a particularly disadvantageous result because other than for initial pressurization a significantly smaller generation system could be used.

In a more specific example, fire protection systems installed in cold environments, for example, freezers, present a further challenge. As the moisture in the compressed air condenses in the pipe network of a fire protection system, the water freezes to form ice that may restrict flow or even create an ice block or dam within the piping, preventing further gas or water flow altogether. Notably, it is generally accepted within the industry that the best practice is to use a gas with a dew point of at least 20° F. below the lowest temperature being maintained in the environment in which the fire protection system is being used in order to avoid the buildup of ice within the pipe network.

Existing technology uses regenerative desiccant air dryers to supply the dry pipe and preaction fire protection systems with low dew point compressed air to prevent ice buildup. This existing technology is cumbersome and expensive to maintain which often results in the equipment not being operated properly and thus not providing the level of protection that was intended. The Factory Mutual Property Loss Prevention Data Sheet ("FMDS") 8-29 (Refrigerated Storage), the disclosure of which is expressly incorporated by reference herein in its entirety, estimates that as much as 50% of current dry pipe and preaction fire protection systems encounter ice accumulation and obstruction of pipes in the network, which significantly impacts performance and effectiveness of these systems.

Flushing and purging with 90% or greater nitrogen, with its low dew point, eliminates the need for the regenerative desiccant or other types of air dryers. The use of nitrogen or a similarly inert gas as a supervisory gas within fire protection systems is presented in U.S. Pat. Nos. 9,144,700 and 9,186, 533 as well as Published U.S. Application US20160008644A1, the disclosures of which are expressly incorporated by reference herein in their entirety. As presented in the foregoing references, the use of an inert gas such as nitrogen provides an effective means to minimize or eliminate corrosion within the pipe networks of fire protection systems of all types.

While corrosion is not a concern in cold or freezing environments because there is no liquid water in the supervisory air for oxygen to dissolve into, the low dew point of 98% nitrogen—which is the typical purity of nitrogen used in systems that take advantage of this improved method—at −100° F. provides superior protection against ice accumulation. It is generally accepted within the industry that the best practice is to use a gas with a dew point of at least 20° F. below the lowest temperature being maintained in the environment in which the fire protection system is being used. In the case of fire protection systems installed in cold environment, such as freezers, this can present issues in terms of sizing an appropriate inert gas generator and may result in increased equipment costs for these systems as well.

SUMMARY

This section provides a general summary of the disclosure, and is not a comprehensive disclosure of its full scope or all of its features.

According to one aspect of the present disclosure, there is provided an adjustable inert gas generation assembly for producing a flow of inert gas for introduction into a pipe network of a fire protection system that includes an inert gas generator with an outlet in fluid communication with the pipe network and configured for selectively producing a flow of inert gas to the pipe network at least at a first purity level and a second purity level, wherein the first purity level is produced while the assembly is in a first mode and the second purity level is produced while the assembly is in a second mode; wherein the second purity level is higher than the first purity level; and a control circuit in electrical communication with the inert gas generator and configured to selectively switch the inert gas generator between the first and second modes.

According to another aspect of the present disclosure, the inert gas generator is further configured to selectively produce a flow of inert gas to the pipe network at a third purity level while the assembly is in a third mode, with the third purity level being greater than the first and second purity levels and wherein the control circuit is further configured to selectively switch the inert gas generator among the first, second, and third modes.

According to yet another aspect of the present disclosure, there is provided A method of supplying an inert gas to a pipe network of a fire protection system that includes the steps of providing an inert gas generation assembly having an inert gas generator having an outlet in fluid communication with the pipe network and configured for selectively producing a flow of inert gas to the pipe network at a first purity while in a first mode and a second purity while in a second mode, wherein the second purity is higher than the first purity; and a control circuit in electrical communication with the inert gas generator and configured to selectively switch the inert gas generator between the first and second modes; sensing a current pressure within the pipe network; generating an input signal based on the current pressure; transmitting the input signal to the control circuit; determining a pressure within the pipe network is less than or equal to or greater than a desired supervisory pressure and generating an output signal based on the resulting comparison; and transmitting the output signal to the inert gas generator to selectively initiate one of the first or second mode.

It is noted that while preaction fire protection systems are sometimes considered to represent a subset of dry pipe fire protection systems, preaction systems are also frequently considered by those in the industry as being distinct from dry pipe systems. The device and method of the present disclosure is suitable for use with dry pipe and preaction fire protection systems. The use of dry pipe or preaction in reference to fire protection systems in this disclosure is not intended to exclude application of the disclosed components, systems, and methods to other fire protection systems. However, some embodiments of the present disclosure may be more suitable to a dry pipe or preaction system, respectively.

DRAWINGS

The drawings described herein are for illustrative purposes only of selected embodiments and not all possible implementations, and are not intended to limit the scope of the present disclosure.

DETAILED DESCRIPTION

Figure 1:
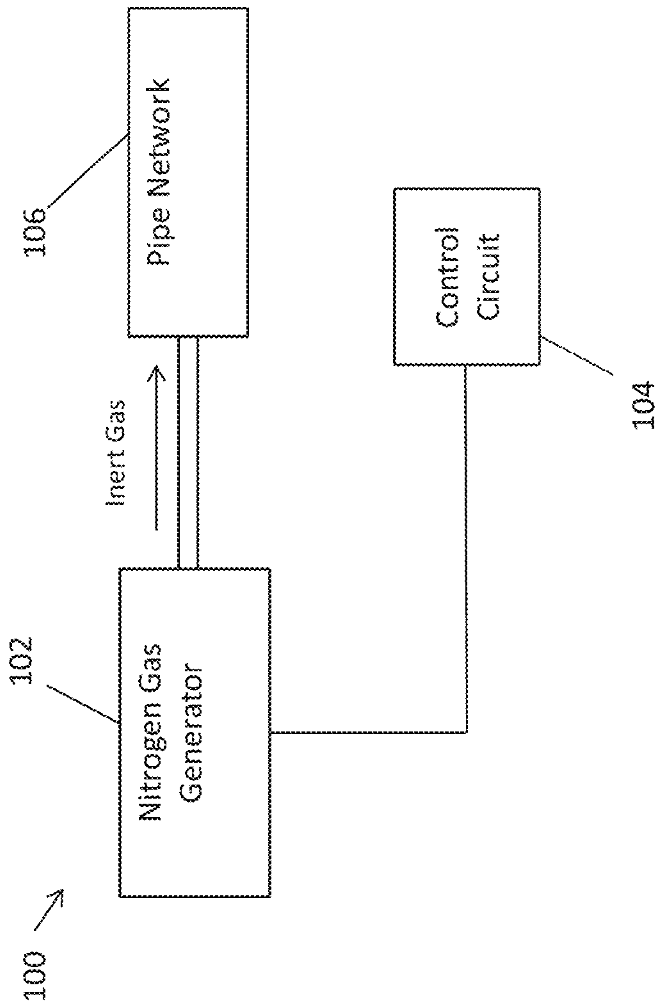
FIG. 1 is a block diagram of an inert gas generator assembly for supplying an inert gas to a pipe network of a water-based fire protection system assembly according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be noted that fire protection systems are generally subject to the requirements and guidelines of the standards presented in, among others, NFPA 13 (Standard for the Installation of Sprinkler Systems), NFPA 25 (Standard for the Inspection, Testing, and Maintenance of Water-Based Fire Protection Systems), and FMDS 8-29 (Refrigerated Storage), the disclosures of which are hereby incorporated by reference herein and portions of which may be expressly referenced in the present disclosure. While embodiments of the systems and methods of the present disclosure may meet the requirements and guidelines of these standards, the present disclosure is not limited to fire protection systems that are compliant with these standards.

The compressed gas sources disclosed herein may include one or more generators and/or other suitable sources. The compressed gas disclosed herein may include any suitable inert gas such as nitrogen. Nitrogen generators can provide nitrogen on-demand to fill and/or purge a fire protection system as desired, automatically based on a sensor, such as an oxygen sensor, on a periodic basis, or on a continuous basis. Nitrogen generators are capable of generating a stream of gas having a greater concentration of nitrogen than air. Generators are available that are capable of producing a mix of about 78% nitrogen, at least 85%, at least 90%, at least 95%, or at least 99% nitrogen.

Nitrogen generators include nitrogen membrane systems and nitrogen pressure swing adsorption systems. A membrane nitrogen generator is a modular system consisting of pre-filtration, separation, and distribution sections. Controls for the system are included in the nitrogen separation unit. Ambient air enters the feed air compressor, which may be an oil injected rotary screw air compressor, via its inlet filter. Air is compressed and travels through an aftercooler and, in many systems, a refrigerated air dryer. Inside the membrane nitrogen generation unit, the first item the feed air comes in contact with is the filtration system, which utilizes a combination of particulate, coalescing, and carbon adsorption technologies. The filters are fitted with automatic condensate drains. Units may be fitted with an air circulation heater and controls, which is installed in the air stream before the nitrogen membrane(s), but after the final filter and pressure regulator. The heater maintains a constant temperature of compressed air to the membranes, enhancing stability and performance.

The nitrogen membrane module(s) are located in the heated air stream. On lower purity systems, such as 99% N2 and below, the membranes are connected in parallel. On higher purity systems, such as 99% N2 or higher, the membranes may be connected in series or using a combination of series and parallel. Slowing down the flow through the membrane separators will automatically give higher nitrogen purity as well. High purity systems have separate permeate connections. One is strictly waste gas, but the second one is a line that can be re-circulated back to the feed compressor intake to enhance purity and productivity. After the air passes through the membrane bundle(s), it is essentially nitrogen plus trace amounts of inert gasses and the specified oxygen content. A built-in flow meter may be installed to constantly monitor nitrogen flow. The nitrogen membrane module(s) may be operated at ambient temperatures as well to eliminate the need for electricity. Operation at reduced temperatures may yield lower productivity or reduced nitrogen purity.

In a pressure swing adsorption (PSA) nitrogen generator the adsorption technology is a physical separation process, which uses the different adsorption affinities of gases to a microporous solid substance, the so-called adsorbent. Oxygen, for example, has a higher adsorption capacity or quicker adsorption time to some carbon molecular sieves compared to nitrogen. This characteristic is used within the PSA process for the generation of nitrogen from air. The main advantages of this process are the ambient working temperature, which results in low stresses to equipment and adsorbent material, and the low specific power consumption.

The PSA-nitrogen generator typically includes the following components: air compressor, refrigerant dryer, air receiver tank, two adsorber vessels filled with adsorbent material and a product buffer. Each adsorber operates on an alternating cycle of adsorption and regeneration resulting in a continuous nitrogen product flow. PSA-nitrogen generators may be designed with just one adsorber vessel as well in order to simplify the design.

The PSA-nitrogen generator works according to the following process steps. First is an adsorption step, where compressed and dried air at ambient temperature is fed into the PSA-vessel (adsorber) at the compressor discharge pressure. The adsorber is filled with molecular sieves. The remaining moisture and carbon dioxide in the air are removed at lower layers of the bed and oxygen is adsorbed by the upper molecular sieve filling. The remaining, nitrogen-rich product gas leaves the adsorber at the outlet and is fed to the nitrogen buffer. Before the adsorption capacity for oxygen is depleted, the adsorption process is interrupted so that no oxygen can break through at the adsorber outlet. Second is a regeneration\purge step, where the saturated adsorber is regenerated by means of depressurization and additionally by purging with nitrogen produced by the second adsorber in order to remove the adsorbed gases H2O, CO2, and O2 from the adsorbent bed. The waste gas is vented to the atmosphere. Third is a re-pressurization step, where after regeneration the adsorber is refilled with air and part of the recycled nitrogen. The adsorber is then ready for the next adsorption step.

The present disclosure describes systems involving the use of a plumbing and control configuration such that an inert gas generator, for example, a nitrogen gas generator, can be switched manually or automatically between two (or more) inert gas purities so that a fast fill function can be enabled and subsequently a maintenance mode can be enacted.

An inert gas generator assembly for supplying an inert gas to a pipe network of a water-based fire protection system according to one example embodiment of the present disclosure is illustrated in FIG. 1 and indicated generally by reference number 100. As shown in FIG. 1, the inert gas generator assembly 100 includes an inert gas generator 102 and a control circuit 104 coupled to the inert gas generator 102. The inert gas generator 102 is configured to couple to a pipe network 106 for providing inert gas to the pipe network 106. The inert gas generator 102 is operable in at least two different modes. The control circuit 104 is configured to control the inert gas generator 102 to operate in one of the at least two different modes based on one or more parameters.

The governing standard for the installation of fire protection systems, NFPA 13 (Installation of Sprinkler Systems), the disclosure of which is expressly incorporated by reference herein in its entirety, requires that the supervisory gas source for a dry or preaction fire protection system be sized such that it can bring the pipe network of the system to operating pressure within thirty (30) minutes or within sixty (60) minutes for pipe networks operating in areas maintained below 5° F. This may be done with an air compressor, an inert gas generator and/or another gas source. The supervisory pressure acts to hold water pressure back via a differential pressure valve (not shown in FIG. 1) until sufficient activation events occur to release the water and allow it to flow past the differential pressure valve and into the pipe network 106 as described in more detail in U.S. Pat. No. 9,186,533, the entire disclosure of which is hereby incorporated by reference herein. Additionally, the supervisory pressure ensures pipe network integrity. For example, compromises in the pipe network 106 may be identified due to the presence of water (if the pipe network 106 is filled with water), gas, etc. These compromises may not be immediately evident if the pipe network is filled with atmospheric pressure.

After the water-based fire protection system is brought up to supervisory pressure, the pressure in the pipe network 106 may be maintained by supplying a necessary amount of gas from the gas source. For example, to ensure the pressure within the pipe network 106 does not fall below the supervisory pressure (and actuate the differential pressure valve), the gas source is required to provide gas at a rate that exceeds a leak rate of the water-based fire protection system. Additionally, it may be desirable for the gas source to provide gas at a rate significantly greater than the leak rate of the water-based fire protection system to avoid undesirably high duty cycles of the gas source.

Preferably, inert gas (e.g., nitrogen gas, etc.) is supplied to the pipe network 106 to displace oxygen molecules contained within the pipe network 106 and/or limit the amount of oxygen that is introduced into the pipe network 106. This may reduce corrosion within the fire protection systems if, for example, the oxygen molecules are displaced at a rate that exceeds the kinetics of the oxygen corrosion reaction. The oxygen molecules may be introduced into the system by having openings in the pipe network 106, using a compressor to fill (e.g., pressurize) the pipe network, etc.

Once the gas mixture in the water-based fire protection system reaches a target purity (e.g., the inert gas purity of the injected inert gas), any additional injection of inert gas will not purge any additional amounts of oxygen molecules in the pipe network 106. As a result, once the target purity is reached, further injection of inert gas at the target purity (e.g., less than 100% purity) may result in additional corrosion. This is because the injected gas includes at least some oxygen. For example, the source gas may have an inert gas (e.g., nitrogen gas) content of about 98% and an oxygen content of about 2%. Therefore, once the target purity is reached, it may be beneficial from a corrosion standpoint to increase the purity of the inert gas being injected to further limit the amount of oxygen entering the system.

In some preferred embodiments, the inert gas generator 102 includes a nitrogen generator producing nitrogen gas. This nitrogen gas may be produced by using membrane separation, pressure swing adsorption (PSA), etc. These techniques for generating nitrogen gas require a feedstock of compressed air from which the nitrogen is separated from other gases in atmospheric air. There are many variables that affect the rate of separation of nitrogen gas. For example, temperature, feed air pressure, membrane differential pressure, hold times, nitrogen gas purity, etc. may affect the rate of separation of nitrogen gas.

Generally, when the purity of produced nitrogen gas increases, the volume of nitrogen produced from a given volume of compressed air decreases. The inverse is also true. In other words, when the purity of produced nitrogen gas decreases, the volume of nitrogen produced from a given volume of compressed air increases. Based on these relationships, the purity of the nitrogen gas produced from a nitrogen generator may be modulated to produce nitrogen gas at a desired rate and/or to produce nitrogen gas at a constant specified purity.

In some examples, corrosion in water-based fire protection systems may be controlled by introducing nitrogen gas at a purity of 98%. However, utilizing a nitrogen generator to produce nitrogen gas at a purity of 98% at a necessary rate to meet the supervisory pressure fill requirement (e.g., thirty minutes or less or, in applications of environments having temperature os 5° F. or less, sixty minutes or less) and to maintain the supervisory pressure at a given volume is costly. For example, the cost of producing nitrogen gas at a purity of 98% at a necessary rate that meets the supervisory pressure fill requirement and maintains the supervisory pressure at a given volume is significantly higher than the cost of producing nitrogen gas at a purity of 98% at a rate that maintains the supervisory pressure but does not meet the supervisory pressure fill requirement.

Thus, it would be beneficial to operate the nitrogen generator or another suitable inert gas generator 102 in different modes depending on, for example, the status of the pipe network 106. This may allow the gas generator 102 to adjust the purity of the generated gas as necessary to meet the supervisory pressure fill requirement, inert the pipe network 106 and/or maintain the supervisory pressure. For example, the inert gas generator 102 may be operated in one of two or three different modes depending on if the pipe network 106 is in a filling process, an inerting process, and/or a maintenance process. As such, the different modes of operation for the inert gas generator 102 may include a fill mode, an inert mode, and a maintenance mode.

In the fill mode, the inert gas generator 102 may generate and provide enough inert gas to the pipe network 106 to ensure the water-based fire protection system reaches its supervisory pressure in thirty minutes or less. For example, if the inert gas generator 102 includes a nitrogen generator, the supervisory pressure fill requirement may be accomplished by generating and providing nitrogen gas to the pipe network 106 at a purity greater than the nitrogen content of atmosphere. In other words, the nitrogen generator may meet the supervisory pressure fill requirement by generating and providing nitrogen gas to the pipe network 106 at a purity greater than about 78% (nitrogen).

Once the pipe network 106 is pressurized to or above the supervisory pressure, the control circuit 104 may switch the inert gas generator 102 to the inert mode. During this time, the inert gas generator 102 may produce an inert gas (e.g., nitrogen) at a purity to ensure the gas mixture in the pipe network 106 reaches a defined target purity level within a defined period of time. In some examples, the defined target purity level may be about 98%. Thus, if the inert gas generator 102 includes a nitrogen generator, the nitrogen generator may produce nitrogen at a purity of 98% to ensure the gas mixture in the pipe network 106 reaches about 98% nitrogen.

After the gas mixture in the pipe network 106 reaches the defined purity level, the control circuit may switch the inert gas generator 102 to the maintenance mode. For example, the inert gas generator 102 may produce inert gas at a purity level higher than the purity level used in the inert mode. In some embodiments where the inert gas generator 102 includes a nitrogen generator, the purity level during the maintenance mode may be at least 98% nitrogen. In other examples, the inert gas generator 102 may produce inert gas at its highest purity possible. Further, a flow rate of inert gas during the maintenance mode may be sufficient to produce a volume of inert gas that exceeds a leak rate of the system and prevents the differential pressure valve (e.g., a dry pipe valve, a preaction valve, etc.) from actuating.

The control circuit 104 may change which mode the inert gas generator 102 is operated in based on one or more parameters. For example, the control circuit 104 may change the mode between the fill mode, the inert mode and/or the maintenance mode based on one or more characteristics of the water-based fire protection system. In such examples, the system characteristics may include one or more of a system volume, a system operating pressure, and a system leak rate, and the control circuit 104 may have one or more sensors to detect those system parameters.

Additionally and/or alternatively, the control circuit 104 may change the mode based on one or more characteristics of the inert gas generator 102. For example, the inert gas generator characteristics may include one or more of a volume of inert gas produced at a defined purity level and real-time inert gas production volume data. In some embodiments, the volume of inert gas produced at the defined purity level may be based on a temperature, a feed pressure and/or a discharge pressure.

Figure 2:
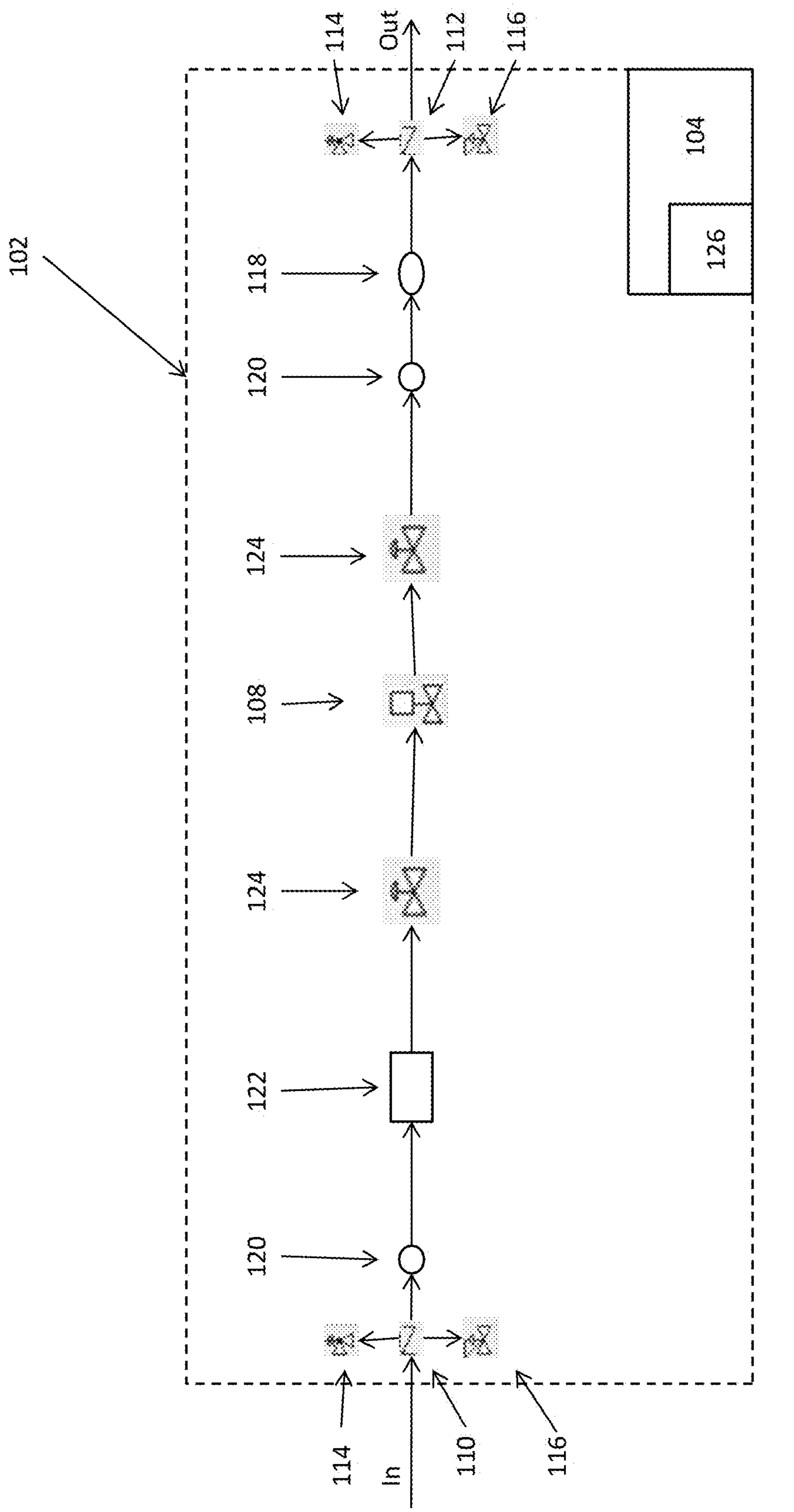
FIG. 2 is a block diagram of an inert gas generator assembly for supplying an inert gas to a pipe network of a water-based fire protection system assembly according to one example embodiment of the present disclosure.

In some embodiments, the inert gas generator 102 may include various valves, sensors, etc. in different embodiments, such as that shown schematically in FIG. 2. FIG. 2 illustrates one possible embodiment of the inert gas generator 102, and the various valves and sensors may appear in the order shown or in any other suitable position relative to the generator 102. For example, the inert gas generator 102 may include an adjustable valve 108 (e.g., an automated proportional control valve) to control the flow rate of inert gas produced in each mode. For example, the flow rate while the generator is in the fill mode may be greater than the flow rate during the inerting and/or maintenance mode in order to bring the pipe network up to the target supervisory pressure within the desired or required time frame. Additionally, the inert gas generator 102 may include one or more feed pressure valves 110 to control the feed pressure of compressed gas to the inert gas generating technology and a discharge pressure valve 112 to control the minimum discharge pressure of inert gas from the inert gas generating technology. In such examples, the valves 110, 112 may include an air relief valve 114 (e.g., an air relief regulator such as an automated compressed air relief regulator) and/or a back pressure regulator 116 (e.g., an automated back pressure regulator), etc.

The inert gas generator 102 may also include one or more purity sensors 118 and/or temperature sensors 120. For example, the inert gas generator 102 may include an inert gas (e.g., nitrogen) purity sensor 118 to measure the purity of inert gas produced by the inert gas generator 102. Additionally, the inert gas generator 102 may include one or more temperature sensors 120 to sense an ambient temperature, a temperature of the incoming compressed air, and/or an inlet temperature of the inert gas generating technology.

The control circuit 104 may receive the sensed information from the purity 118 and/or temperature 120 sensors measuring conditions that affect the purity of the inert gas produced. In response to the received information, the control circuit 104 may adjust controllable valves, for example, regulators 122, flow control valves 124 and/or other controllable output devices, to reach a target purity for the inert gas produced depending on which mode the inert gas generator 102 is operated in.

The control circuit 104 may include any suitable control circuit including, for example, a programmable controller 126. The control circuit 104 may include a digital controller programmed to implement one of more algorithms for controlling which mode of operation is employed, adjusting the controllable valves based on the sensed information, etc.

The water-based fire protection systems disclosed herein may also include various optional components. For example, the systems may include one or more filters, pressure gauges, gas sampling ports, directional flow valves (e.g., isolation ball valves, drain valves, etc.), and/or strainers (e.g., "Y" strainers having a perforated mesh screen such as a wire mesh screen), etc.

By operating an inert gas generator in different modes as disclosed herein, corrosion control in the system may be more effective as compared to conventional systems by limiting the cumulative amount of oxygen molecules injected into the pipe network when bringing the system up to its operating pressure, limiting the amount of oxygen molecules introduced into the system after the system is brought up to its operating pressure by optimizing inert gas output purity, etc., while, at the same time, significantly enhancing the economic efficiency and performance of the system.

The foregoing embodiments are particularly suitable for cold air applications, for example, freezer environments. In the specific example of a fire protection system in a freezing environment, the objective would be to maintain an inert gas purity during the initial fill such that the dew point of the inert gas being produced has a dew point 20° F. below the temperature of the freezer being protected by the fire protection system. Once the fire protection system is at operating pressure, the inert gas generator, either manually or automatically, would switch to a higher inert gas purity rate for the lower volume of gas that is required to maintain the supervisory pressure in the fire protection system. In an a particularly advantageous embodiment for freezer applications, an automated system is provided to allow a user to key in a temperature for the freezer along with an operating pressure for the dry or preaction system being served and then an algorithm and control equipment automatically determine the required purity of nitrogen gas to meet the requirement of 20° F. below the temperature of the freezer being protected and then detect when the system is at operating pressure to then switch to a higher purity of nitrogen to maintain the pressure in the pipe network.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of supplying an inert gas to a pipe network of a fire protection system, comprising the steps of:

providing an inert gas generation assembly, comprising:

an inert gas generator having an outlet in fluid communication with the pipe network and configured for selectively producing a flow of inert gas to the pipe network at a first purity and a first flow rate while in a first mode and a second purity and a second flow rate while in a second mode, wherein the second purity is higher than the first purity and the first flow rate is higher than the second flow rate, the first flow rate raising a current pressure within the pipe network to a supervisory pressure within a supervisory pressure fill requirement; and a control circuit in electrical communication with the inert gas generator and configured to selectively switch the inert gas generator between the first and second modes;

sensing the current pressure within the pipe network;

generating an input signal based on the current pressure;

transmitting the input signal to the control circuit;

determining in the control circuit whether the current pressure within the pipe network is less than or at least equal to or greater than the supervisory pressure and generating in the control circuit an output signal based on the determination of whether the current pressure within the pipe network is less than or at least equal to or greater than the supervisory pressure; and transmitting the output signal to the inert gas generator to selectively initiate the first mode when the current pressure within the pipe network is less than the supervisory pressure and to selectively initiate the second mode when the current pressure within the pipe network is at least equal to or greater than the supervisory pressure.

2. The method of supplying an inert gas to a pipe network of a fire protection system as set forth in claim 1, further comprising the step of sensing a current concentration of inert gas within the pipe network with a gas purity sensor of the inert gas generator, wherein the step of generating an input signal comprises generating the input signal based on the current pressure and the current concentration of inert gas within the pipe network, the method further comprising, when the second mode has been selected, continuing operation of the inert gas generator in the second mode until the current concentration of inert gas within the pipe network reaches a target purity level.

3. The method of supplying an inert gas to a pipe network of a fire protection system as set forth in claim 2, wherein the inert gas generation assembly is further configured for selectively producing a flow of inert gas to the pipe network at a third purity while in a third mode, the third purity being higher than the second purity, the method further comprising the step of determining whether the current concentration of inert gas within the pipe network is less than or at least equal to the target purity level and selectively initiating the third mode when the current concentration of inert gas within the pipe network is at least equal to the target purity level.

4. The method of supplying an inert gas to a pipe network of a fire protection system as set forth in claim 3, further comprising the step of determining a leak rate of the pipe network, the leak rate being equal to a volume of gas escaping from the pipe network over time, wherein the third mode includes a third flow rate, the method further comprising the step of adjusting the third flow rate to greater than the leak rate of the pipe network.

5. The method of supplying an inert gas to a pipe network of a fire protection system as set forth in claim 1, further comprising the step of determining at least one parameter of the pipe network among a system volume, a system leak rate, and a volume of inert gas produced by the inert gas generator, wherein the step of generating an input signal further comprises generating the input signal based on the current pressure within the pipe network and at least one of the system volume, the system leak rate, and the volume of inert gas produced by the inert gas generator.

6. The method of supplying an inert gas to a pipe network of a fire protection system as set forth in claim 1, further comprising the step of determining at least one parameter among an ambient temperature, a temperature of feed air to the inert gas generator, a pressure feed air to the inert gas generator, and a pressure of gas discharged from the inert gas generator, wherein the step of generating an input signal further comprises generating the input signal based on at least one of the ambient temperature, the temperature of feed air to the inert gas generator, the pressure feed air to the inert gas generator, and the pressure of gas discharged from the inert gas generator.

7. The method of supplying an inert gas to a pipe network of a fire protection system as set forth in claim 1, wherein the inert gas generator is a nitrogen gas generator, and wherein said inert gas is nitrogen gas.

8. The method of supplying an inert gas to a pipe network of a fire protection system as set forth in claim 1, wherein both the first and second purity having a nitrogen concentration greater than that of ambient air.

* * * * *